(12) United States Patent
Alaettinoglu et al.

(10) Patent No.: US 12,267,102 B2
(45) Date of Patent: Apr. 1, 2025

(54) PRIORITIZING OPTICAL ROUTES FOR RESTORATION BASED ON FAILURE IMPACT ON AN IP LAYER

(71) Applicant: Ciena Corporation, Hanover, MD (US)

(72) Inventors: Cengiz Alaettinoglu, Sherman Oaks, CA (US); Gerard Leo Swinkels, Ottawa (CA); John K. Oltman, Atlanta, GA (US)

(73) Assignee: Ciena Corporation, Hanover, MD (US)

( * ) Notice: Subject to any disclaimer, the term of this patent is extended or adjusted under 35 U.S.C. 154(b) by 200 days.

(21) Appl. No.: 18/115,400

(22) Filed: Feb. 28, 2023

(65) Prior Publication Data

US 2024/0291559 A1  Aug. 29, 2024

(51) Int. Cl.
*H04B 10/03* (2013.01)
*H04B 10/07* (2013.01)
(Continued)

(52) U.S. Cl.
CPC ......... *H04B 10/03* (2013.01); *H04Q 11/0005* (2013.01); *H04B 10/07* (2013.01);
(Continued)

(58) Field of Classification Search
None
See application file for complete search history.

(56) References Cited

U.S. PATENT DOCUMENTS 6,795,394 B1  9/2004  Swinkels et al.
6,996,342 B2  2/2006  Park et al.
(Continued)

FOREIGN PATENT DOCUMENTS

EP  3113415 A1  1/2017
EP  3886338 A1  9/2021
(Continued)

OTHER PUBLICATIONS

M. Savi, et al., "Application-aware service provisioning and restoration in SDN-based multi-layer transport networks," Optical Switching and Networking, vol. 30, Jun. 27, 2018, pp. 71-84.
(Continued)

*Primary Examiner* — Darren E Wolf
(74) *Attorney, Agent, or Firm* — Baratta Law PLLC; Lawrence A. Baratta, Jr.

(57) ABSTRACT

Systems and methods include receiving a list of prioritized optical restoration paths for each of a plurality of failures in a multi-layer network, wherein each list of prioritized optical restoration paths for a corresponding failure of the plurality of failures is determined based on modeling impact of the given failure on a higher layer, relative to an optical layer; and, responsive to a failure of the plurality of failures, utilizing a corresponding list of prioritized optical restoration paths for the failure to restore services in the optical layer. The modeling impact can include determining new routes and link utilization in the higher layer, prioritizing links in the higher layer, and utilizing the prioritized links to determine the list of prioritized optical restoration paths, for the given failure. The higher layer can be an Internet Protocol (IP) layer.

20 Claims, 8 Drawing Sheets

(51) Int. Cl.
*H04Q 11/00* (2006.01)
*H04B 10/40* (2013.01)
*H04B 10/50* (2013.01)
*H04B 10/60* (2013.01)

(52) U.S. Cl.
CPC .............. *H04B 10/40* (2013.01); *H04B 10/50* (2013.01); *H04B 10/60* (2013.01); *H04Q 2011/0043* (2013.01)

(56) References Cited

U.S. PATENT DOCUMENTS

| | | |
|---|---|---|
| 7,120,792 B1 | 10/2006 | Jacobson et al. |
| 7,197,573 B1 | 3/2007 | Jacobson et al. |
| 7,539,191 B1 | 5/2009 | Jacobson et al. |
| 7,796,501 B2 | 9/2010 | Oltman et al. |
| 7,995,569 B2 | 8/2011 | Ashwood-Smith et al. |
| 8,085,676 B2 | 12/2011 | Skalecki et al. |
| 8,089,866 B2 | 1/2012 | Smith et al. |
| 8,135,834 B1 | 3/2012 | Jacobson et al. |
| 8,274,901 B1 | 9/2012 | Casner et al. |
| 8,402,121 B2 | 3/2013 | Skalecki et al. |
| 8,422,502 B1 | 4/2013 | Alaettinoglu et al. |
| 8,553,586 B2 | 10/2013 | Smith et al. |
| 8,553,707 B2 | 10/2013 | Swinkels et al. |
| 8,559,812 B2 | 10/2013 | Oltman et al. |
| 8,619,553 B2 | 12/2013 | Madrahalli et al. |
| 8,682,179 B1 | 3/2014 | Harley et al. |
| 8,750,706 B2 | 6/2014 | Boertjes et al. |
| 8,817,798 B2 | 8/2014 | Skalecki et al. |
| 8,824,331 B1 | 9/2014 | Alaettinoglu et al. |
| 8,937,946 B1 | 1/2015 | Kanna et al. |
| 9,025,435 B2 | 5/2015 | Holness et al. |
| 9,026,674 B1 | 5/2015 | Kanna et al. |
| 9,077,474 B2 | 7/2015 | Boertjes et al. |
| 9,118,421 B2 | 8/2015 | Swinkels et al. |
| 9,124,960 B2 | 9/2015 | Swinkels et al. |
| 9,143,227 B2 | 9/2015 | Moynihan et al. |
| 9,167,318 B1 | 10/2015 | Connolly et al. |
| 9,191,280 B2 | 11/2015 | Swinkels et al. |
| 9,197,355 B2 | 11/2015 | Swinkels et al. |
| 9,240,905 B2 | 1/2016 | Connolly et al. |
| 9,258,190 B2 | 2/2016 | Swinkels et al. |
| 9,407,359 B2 | 8/2016 | Swinkels et al. |
| 9,509,593 B2 | 11/2016 | Sharma et al. |
| 9,628,172 B2 | 4/2017 | Prakash et al. |
| 9,667,570 B2 | 5/2017 | Swinkels et al. |
| 9,680,588 B2 | 6/2017 | Connolly et al. |
| 9,819,586 B2 | 11/2017 | Swinkels et al. |
| 9,832,548 B2 | 11/2017 | Moynihan et al. |
| 9,906,294 B2 | 2/2018 | Al Sayeed et al. |
| 9,918,148 B2 | 3/2018 | Swinkels et al. |
| 9,980,021 B2 | 5/2018 | Oltman et al. |
| 10,063,336 B1 | 8/2018 | Moynihan et al. |
| 10,110,423 B2 | 10/2018 | Skalecki et al. |
| 10,116,552 B2 | 10/2018 | Skalecki et al. |
| 10,257,596 B2 | 4/2019 | Swinkels et al. |
| 10,284,661 B2 | 5/2019 | Skalecki et al. |
| 10,333,777 B2 | 6/2019 | Swinkels et al. |
| 10,341,258 B2 | 7/2019 | Sareen et al. |
| 10,541,923 B2 | 1/2020 | Swinkels et al. |
| 10,824,551 B2 | 11/2020 | Woods et al. |
| 11,057,278 B1 | 7/2021 | Côté et al. |
| 11,496,817 B2 | 11/2022 | MacKay et al. |
| 11,507,262 B2 | 11/2022 | Campbell et al. |
| 2006/0120718 A1* | 6/2006 | Natori ................. H04J 14/0295 398/19 |
| 2008/0240723 A1 | 10/2008 | Kershteyn et al. |
| 2011/0219128 A1 | 9/2011 | Swinkels et al. |
| 2011/0318021 A1* | 12/2011 | Zhou ................. H04L 27/0014 375/376 |
| 2013/0100817 A1 | 4/2013 | Oltman et al. |
| 2013/0177312 A1* | 7/2013 | Nandagopal ........ H04J 14/0284 370/255 |
| 2013/0208595 A1 | 8/2013 | Connolly et al. |
| 2014/0169791 A1 | 6/2014 | Swinkels et al. |
| 2015/0195190 A1* | 7/2015 | Shah Heydari ......... H04L 45/22 714/47.3 |
| 2015/0319033 A1 | 11/2015 | Moynihan et al. |
| 2016/0057049 A1 | 2/2016 | Jacobson et al. |
| 2016/0105380 A1 | 4/2016 | Chhillar et al. |
| 2016/0380818 A1 | 12/2016 | Swinkels et al. |
| 2016/0380880 A1 | 12/2016 | Swinkels et al. |
| 2017/0048018 A1 | 2/2017 | Swinkels et al. |
| 2017/0223436 A1 | 8/2017 | Moynihan et al. |
| 2017/0317744 A1 | 11/2017 | Skalecki et al. |
| 2018/0295429 A1 | 10/2018 | Swinkels et al. |
| 2019/0089455 A1 | 3/2019 | Shikhmanter et al. |
| 2021/0351841 A1* | 11/2021 | Shiner ................. H04J 14/0271 |
| 2022/0086078 A1 | 3/2022 | Sivabalan et al. |
| 2022/0385357 A1 | 12/2022 | Chander et al. |

FOREIGN PATENT DOCUMENTS

| | | |
|---|---|---|
| EP | 3105887 B1 | 3/2022 |
| WO | 2021067231 A1 | 4/2021 |

OTHER PUBLICATIONS

May 14, 2024, International Search Report and Written Opinion for International Patent Application No. PCT/US2024/017272.

* cited by examiner

PRIORITIZING OPTICAL ROUTES FOR RESTORATION BASED ON FAILURE IMPACT ON AN IP LAYER

FIELD OF THE DISCLOSURE

The present disclosure relates generally to networking. More particularly, the present disclosure relates to systems and methods for prioritizing optical routes at Layer 0, for restoration, based on failure impact on an Internet Protocol (IP)-layer (Layer 3).

BACKGROUND OF THE DISCLOSURE

Communication networks are built on various layers, such as defined in the Open Systems Interconnection (OSI) model. Of note, Layer 0 is added to the OSI model to represent the optical, photonic, Dense Wavelength Division Multiplexing (DWDM), etc. layer. As used herein, the term optical is meant to cover all different names for this layer. Layer 0 ("optical layer") and Layer 3 ("IP layer") are two key layers in the actual physical implementation of networks as these have network elements that need to be controlled by control planes, Software Defined Networking (SDN) controllers, and the like to realize connectivity as well as to react to network changes, e.g., new services, new topology changes, faults and restoration, and the like. Traditionally, these layers operate somewhat independently, namely optical capacity is provisioned and managed at Layer 0 whereas packet bandwidth is provisioned and managed at Layer 3, and there is little to no interaction in this process between the layers. There is ongoing work to co-optimize these layers. Of course, it is desirable to add optical capacity to relieve IP layer congestion, as well as address optical layer restoration in a manner that minimizes disruption to the IP layer, and the like. Disadvantageously, the optimization algorithms are NP-hard which are difficult to implement in real-time control of networks where there is a need to react in milliseconds. As such, traditional approaches to co-optimization tend to use approximations and are typically confined to use in network planning and network evolution exercises, versus real-time network control.

BRIEF SUMMARY OF THE DISCLOSURE

The present disclosure relates to systems and methods for prioritizing optical routes at Layer 0, for restoration, based on failure impact on an Internet Protocol (IP)-layer (Layer 3). Variously, the approach described herein is a polynomial time heuristic, meaning it supports use in real-time applications (e.g., control plane, SDN, etc.) for prioritizing optical routes in advance of any optical failures, such that when there is a given failure, the prioritization can be used to reroute traffic at the optical layer to minimize impact to the IP layer. The present disclosure builds on a network management and control architecture, utilizing SDN, that has understanding of both the optical and IP layers. For example, other solutions often limit all traffic being on a tunnel and assume tunnels will just switch to secondary paths. The present disclosure works in presence of tunnels and/or Interior Gateway Protocol (IGP) shortest paths, is accurate when link failures cause Border Gateway Protocol (BGP) exit router changes (e.g., traffic that used to go to provider X on the west coast is now going to provider X on the east coast), static bandwidth reservations, or dynamic computed traffic matrices from Internet Protocol Flow Information Export (IPFIX) or from link utilizations.

In some embodiments, a method includes steps and a non-transitory computer-readable medium includes instructions that, when executed, cause at least one processor to perform the steps. The steps include receiving a list of prioritized optical restoration paths for each of a plurality of failures in a multi-layer network, wherein each list of prioritized optical restoration paths for a corresponding failure of the plurality of failures is determined based on modeling impact of a given failure on a higher layer, relative to an optical layer; and, responsive to a failure of the plurality of failures, utilizing a corresponding list of prioritized optical restoration paths for the failure to restore services in the optical layer. The modeling impact can include determining new routes and link utilization in the higher layer, prioritizing links in the higher layer, and utilizing the prioritized links to determine the list of prioritized optical restoration paths, for the given failure.

The higher layer can be an Internet Protocol (IP) layer. The modeling can be performed in Software Defined Networking (SDN) application that monitor the IP layer, determines and estimates a traffic matrix, and that analyzes the impact of the given failure on the IP layer. The higher layer can be an Ethernet layer. The steps can further include utilizing the corresponding list of prioritized optical restoration paths for the failure to restore services in the optical layer, via a Software Defined Networking (SDN) controller that has a centralized view of the multi-layer network.

The steps can further include utilizing the corresponding list of prioritized optical restoration paths for the failure to restore services in the optical layer, via a network element participating in a distributed control plane. The network element can utilize different hold priorities for restoration and home paths, for preemption of higher priority services in the multi-layer network. The network element can utilize delay timers for each of a plurality of priorities of services in the list of prioritized optical restoration paths.

In another embodiment, a controller includes at least one processor; and memory storing instructions that, when executed, cause the at least one processor to receive a list of prioritized optical restoration paths for each of a plurality of failures in a multi-layer network, wherein each list of prioritized optical restoration paths for a corresponding failure of the plurality of failures is determined based on modeling impact of a given failure on a higher layer, relative to an optical layer, and, responsive to a failure of the plurality of failures, utilize a corresponding list of prioritized optical restoration paths for the failure to restore services in the optical layer. The modeling impact can include determining new routes and link utilization in the higher layer, prioritizing links in the higher layer, and utilizing the prioritized links to determine the list of prioritized optical restoration paths, for the given failure.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for prioritizing optical routes at Layer 0, for restoration, based on failure impact on the IP-layer. Variously, the approach described herein is a polynomial time heuristic, meaning it supports use in real-time applications (e.g., control plane, SDN, etc.) for prioritizing optical routes in advance of any optical failures, such that when there is a given failure, the prioritization can be used to reroute traffic at the optical layer to minimize impact to the IP layer. The present disclosure builds on a network management and control architecture, utilizing SDN, that has understanding of both the optical and IP layers. For example, other solutions often limit all traffic being on a tunnel and assume tunnels will just switch to secondary paths. The present disclosure works in presence of tunnels and/or Interior Gateway Protocol (IGP) shortest paths, is accurate when link failures cause Border Gateway Protocol (BGP) exit router changes (e.g., traffic that used to go to provider X on the west coast is now going to provider X on the east coast), static bandwidth reservations, or dynamic computed traffic matrices from Internet Protocol Flow Information Export (IPFIX) or from link utilizations.

Example Network

Figure 1:
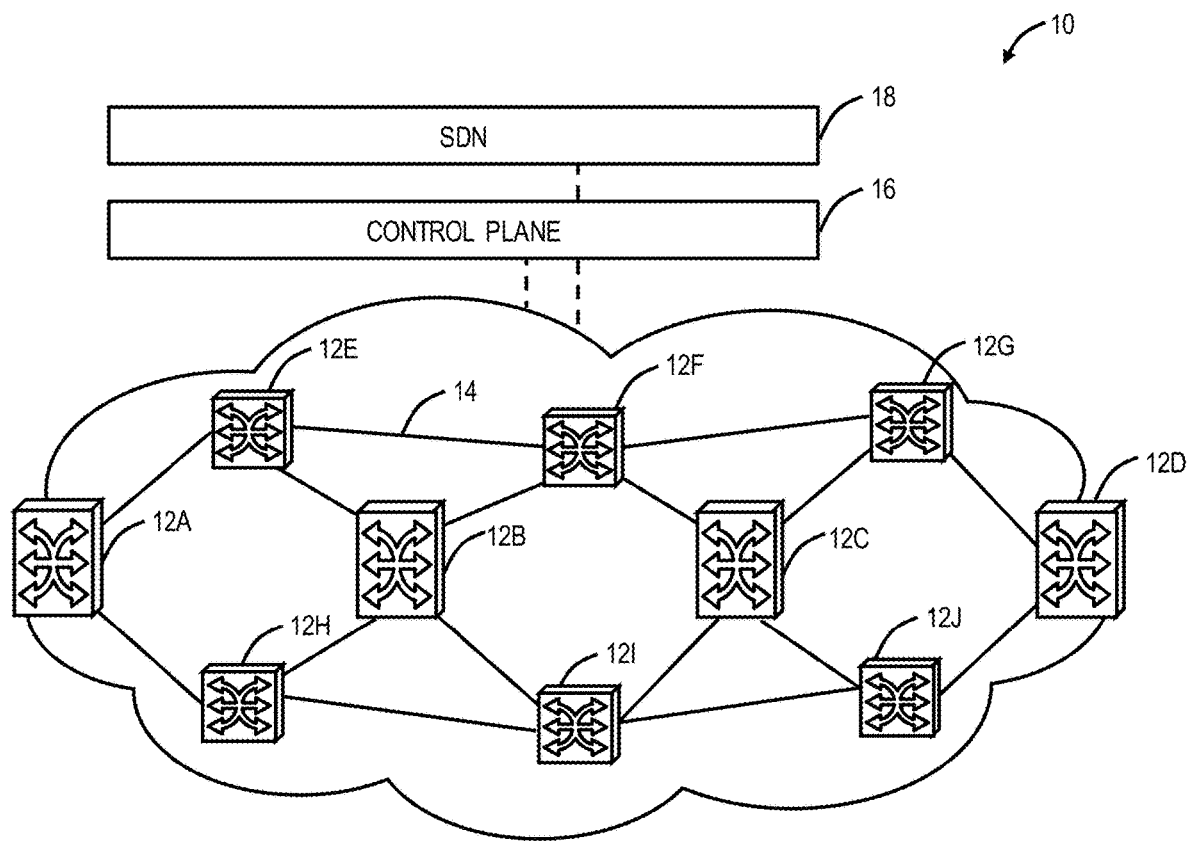
FIG. 1 is a network diagram of an example multi-layer network with various interconnected nodes.
Figure 2:
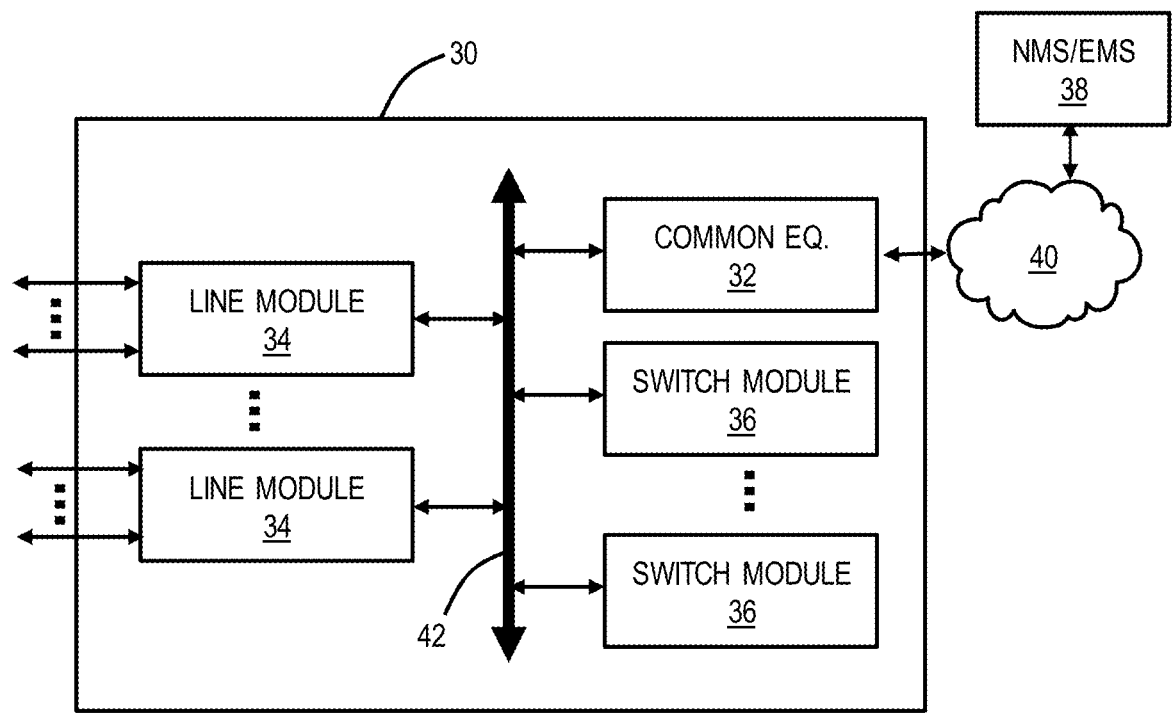
FIG. 2 is a block diagram of an example network element for use with the systems and methods described herein.

FIG. 1 is a network diagram of an example multi-layer network 10 with various interconnected nodes 12 (illustrated as nodes 12A-12J). The nodes 12 are interconnected by a plurality of links 14, which can be either physical (in Layer 0, optical fiber) or logical (such as at higher layers). The nodes 12 communicate with one another over the links 14 through Layer 0 (L0) such as optical wavelengths (DWDM), Layer 1 (L1) such as OTN, Layer 2 (L2) such as Ethernet, Multiprotocol Label Switching (MPLS), etc., and/or Layer 3 (L3) protocols. The nodes 12 can be network elements which include a plurality of ingress and egress ports forming the links 14. An example node implementation is illustrated in FIG. 2. The network 10 can include various services between the nodes 12. Each service can be at any of the L0, L1, L2, and/or L3 protocols, such as a wavelength, a Subnetwork Connection (SNC), a Label Switched Path (LSP), etc. A service is an end-to-end path or an end-to-end signaled path, in terms of management and control. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc.

The network 10 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for calls or services; network level protection and restoration; and the like. The control plane 16 can be different at the different layers.

The control plane 16 provide an automatic allocation of network resources in an end-to-end manner in the network 10. Example control planes include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); Open Shortest Path First (OSPF); Intermediate System-Intermediate System (IS-IS); and the like. Of course, the present disclosure contemplates any type of control plane for controlling network elements at multiple layers, and establishing connections among nodes. That is, those of ordinary skill in the art will recognize the network 10 and the control plane 16 can utilize any type of control plane for controlling the nodes 12 and establishing, maintaining, and restoring calls or services between the nodes 12.

Control planes are configured to establish end-to-end signaled connections such as SNCs in ASON or OSRP and LSPs in GMPLS and MPLS. Note, as described herein, SNCs and LSPs can generally be referred to as services in the control plane 10, to avoid the implementation specific terms of SNCs, LSPs, etc. Control planes use the available paths to route the services and program the underlying hardware accordingly.

Restoration (also referred to as protection) is a key feature in the network 10 where a backup (protection) path takes over for an active (working) path of a service when there is a failure in the active path. Restoration can include dedicated, reserved protection paths (e.g., 1+1) for working paths which provide extremely fast restoration (sub-50 ms) at the expense of efficient bandwidth usage, i.e., the protection paths are active and unused in the network. At the other end of restoration time is mesh restoration which includes computing paths at the time of failures and can lead to several seconds for restoration. Of course, unprotected services can be provisioned without restoration capabilities. Various techniques are used in between these extremes (dedicated protection and mesh restoration with path computation upon failures) to balance the efficient use of bandwidth versus restoration time. Of course, in terms of restoration, the goal is to minimize restoration time while concurrently minimizing the inefficient use of bandwidth. It would be advantageous to support dedicated protection paths which provide the advantage of quick restoration time, without the disadvantage of inefficient bandwidth usage.

One approach in L0 Control Planes (L0CP) is to maintain pre-computed protection paths so that when there is a given failure, the corresponding pre-computed protection paths can be quickly used to determine restoration. The pre-computed protection paths can be managed in a protection path list. As described herein, a protection path list can include a Designated Transit List (DTL) in PNNI and OSRP, an Explicit Route Object (ERO) in Resource Reservation Protocol-Traffic Engineering (RSVP-TE) (G.7713.2) and SR-Policy candidate paths, and the like. That is, the present disclosure contemplates any implementation of a pre-computed protection path list, the term protection path list is meant to cover any implementation (e.g., DTL, ERO, etc.), and the present disclosure may use DTL in the description for illustration purposes; those skilled in the art will recognize DTL is one example of a protection path list and is meant to cover any type.

In addition to control planes which are distributed, a centralized technique of control exists with SDN which utilizes a centralized controller, e.g., an SDN controller 18 can also be communicatively coupled to the network 10 through one or more of the nodes 12. SDN is a framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Examples of SDN include Open-Flow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

SDN works with the SDN controller 18 knowing a full network topology through configuration or through the use of a controller-based discovery process in the network 10. In some embodiments, the SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 may not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof.

Again, the terms SNCs, LSPs, etc. are used in control planes for the services. In SDN, such as in OpenFlow, services are called "flows." In the various descriptions herein, reference is made to SNCs for illustration only of an example embodiment of the systems and methods. Those of ordinary skill in the art will recognize that SNCs, LSPs, flows, or any other managed service in the network can be used with the systems and methods described herein for services. Again, the term services is used for generally describing connections such as SNCs, LSPs, flows, etc. in the network 10.

Example Network Element

FIG. 2 is a block diagram of an example network element 30 for use with the systems and methods described herein. In an embodiment, the network element 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 30 can be any digital system with ingress and egress digital signals and switching of channels, timeslots, tributary units, etc., as well as an optical system with ingress and egress of optical channels.

In an embodiment, the network element 30 includes common equipment 32, one or more line modules 34, and one or more switch modules 36. The common equipment 32 can include power; a control module; Operations, Administration, Maintenance, and Provisioning (OAM&P) access; user interface ports; and the like. The common equipment 32 can connect to a management system 38 through a data communication network 40 (as well as a Path Computation Element (PCE), SDN controller 18, OpenFlow controller, etc.). The management system 38 can include a Network Management System (NMS), Element Management System (EMS), or the like. Additionally, the common equipment 32 can include a control plane processor, such as a controller 50 illustrated in FIG. 3 configured to operate the control plane as described herein. The network element 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the network element 30. In an embodiment, the line modules 34 can form ingress and egress switches with the switch modules 36 as center stage switches for a three-stage switch, e.g., a three-stage Clos switch. Other configurations and/or architectures are also contemplated. The line modules 34 can include optical transceivers, including pluggable optical modules and the like.

Further, the line modules 34 can include a plurality of optical connections per module and each module may include a flexible rate support for any type of connection. The line modules 34 can include wavelength division multiplexing interfaces, short reach interfaces, and the like, and can connect to other line modules 34 on remote network elements, end clients, edge routers, and the like, e.g., forming connections on the links in the network 10. From a logical perspective, the line modules 34 provide ingress and egress ports to the network element 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity (Layer 1 switching); packet switching; and the like. Specifically, the switch modules 36 can include Time Division Multiplexed (TDM) (i.e., circuit switching) and/or packet switching engines. The switch modules 36 can include redundancy as well, such as 1:1, 1:N, etc.

Those of ordinary skill in the art will recognize the network element 30 can include other components which are omitted for illustration purposes, and that the systems and methods described herein are contemplated for use with a plurality of different network elements with the network element 30 presented as an exemplary type of network element. For example, in another embodiment, the network element 30 may not include the switch modules 36, but rather have the corresponding functionality in the line modules 34 (or some equivalent) in a distributed fashion. In a further embodiment, the network element 30 may not include modules, but rather be an integrated device. That is, the modules 32, 34, 36 can be viewed as functional components that may be realized in any manner. For network element 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 30 is merely presented as one network element 30 for the systems and methods described herein.

Example Controller

Figure 3:
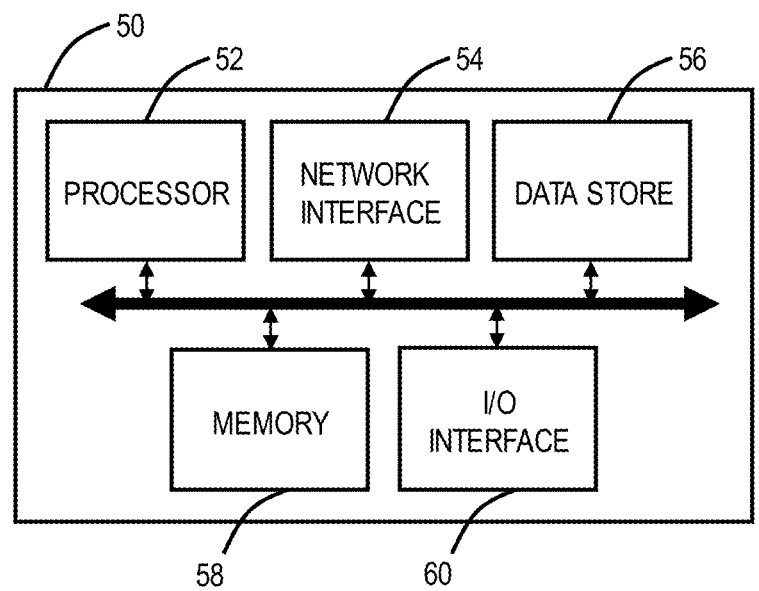
FIG. 3 is a block diagram of a controller configured to provide control plane processing and/or Operations, Administration, Maintenance, and Provisioning (OAM&P) for the network element of FIG. 2, and/or to implement a Software Defined Networking (SDN) controller as in FIG. 1.

FIG. 3 is a block diagram of a controller 50 configured to provide control plane processing and/or Operations, Administration, Maintenance, and Provisioning (OAM&P) for the network element 30, and/or to implement a Software Defined Networking (SDN) controller 18. The controller 50 can be part of the common equipment, such as common equipment 32 in the network element 30, or a stand-alone device communicatively coupled to the network element 30 via the DCN 40. In a stand-alone configuration, the controller 50 can be the SDN controller 18, an NMS, a PCE, etc. The controller 50 can include at least one processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with protocol signals.

The controller 50 is configured to communicate with other controllers 50 in the network 10 to operate the control plane 16 via control plane signaling. This communication may be either in-band or out-of-band. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e., traversing the links through the nodes from the originating node to the destination node based on a plurality of constraints such as administrative weights on the links, bandwidth availability on the links, etc.

Optical Protection

In an example embodiment, optical SNCs, managed by a LOCP, are protected by using a set of protection DTLs (Designated Transit Links; i.e., paths). The originator of the SNC can automatically generate a list of DTLs using the control plane 16 or can download the set of DTLs from a planning tool. The planning tool is preferred as it allows a network wide optimization ("global optimization"), i.e., generating the list of DTLs considering a networkwide view whereas the control plane 16 provides the list based on information within the local node.

When the originator network element 30 of the SNC detects a failure, it can try each DTL until one succeeds (some of the DTLs may fail as other network elements either acting on the same or on a different failure might have grabbed one of the resources). Using a global optimization, like such as from the planning tool, is more likely to restore more SNCs.

This process is currently oblivious to what the IP layer needs. It is possible that a restored SNC was not carrying any traffic at the IP layer, or the IP layer might have routed around this failure without causing congestion. On the other hand, an unrestored SNC might be carrying a lot of traffic at the IP layer and it may not be possible to reroute that traffic without causing congestion or packet drops in the network. Hence, it is very desirable to prioritize DTL sets by considering IP network's needs.

SDN IP Application

Figure 4:
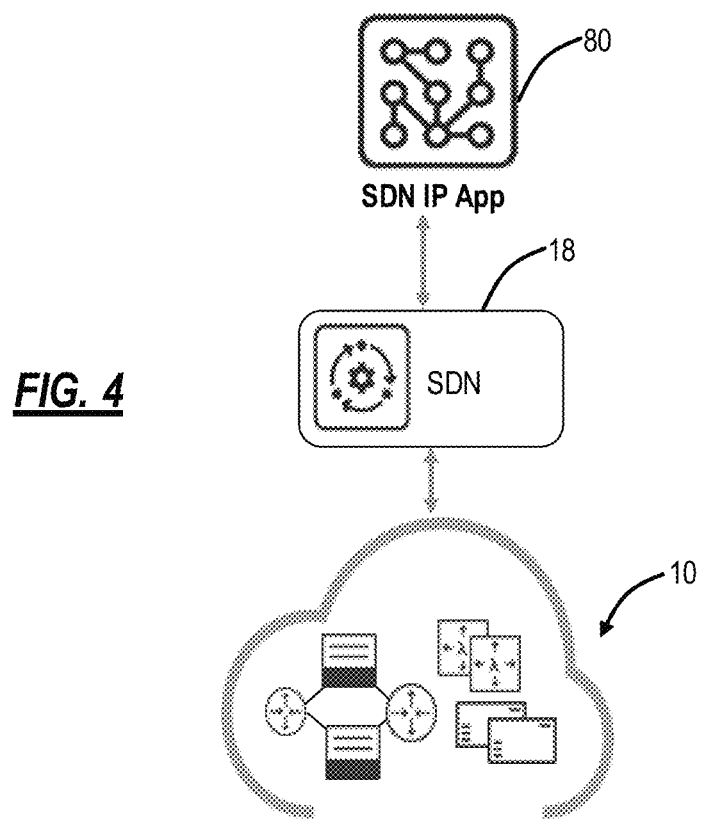
FIG. 4 is a diagram of an SDN IP application architecture.

FIG. 4 is a diagram of an SDN IP application 80 architecture. The SDN IP application 80 communicates with the network 10 through the SDN controller 18. In various embodiments, the SDN IP application 80 supports Layer 3 topology and routing discovery, such as with Border Gateway Protocol Link State (BGP-LS), Intermediate System-Intermediate System (ISIS), Open Shortest Path First (OSPF). Multiprotocol BGP (MP-BGP) (IPv4, IPV6, VPNs, . . . ), Path Computation Element Communication Protocol (PCEP), NetConf/YANG, CLI, etc.]

The SDN controller 18 can provide traffic and performance telemetry, such as via Streaming Generic Remote Protocol Call (GRPC)/GRPC Network Management Interface (GNMI), Netflow/IP Flow Information Export (IPFIX), Simple Network Management Protocol (SNMP), etc. The SDN controller 18 can provision the network 10 such as via PCEP, NetConf/YANG, etc. For example, the SDN IP application 80 can be the Adaptive IP suite of applications, available from Ciena Corporation.

Figure 5:
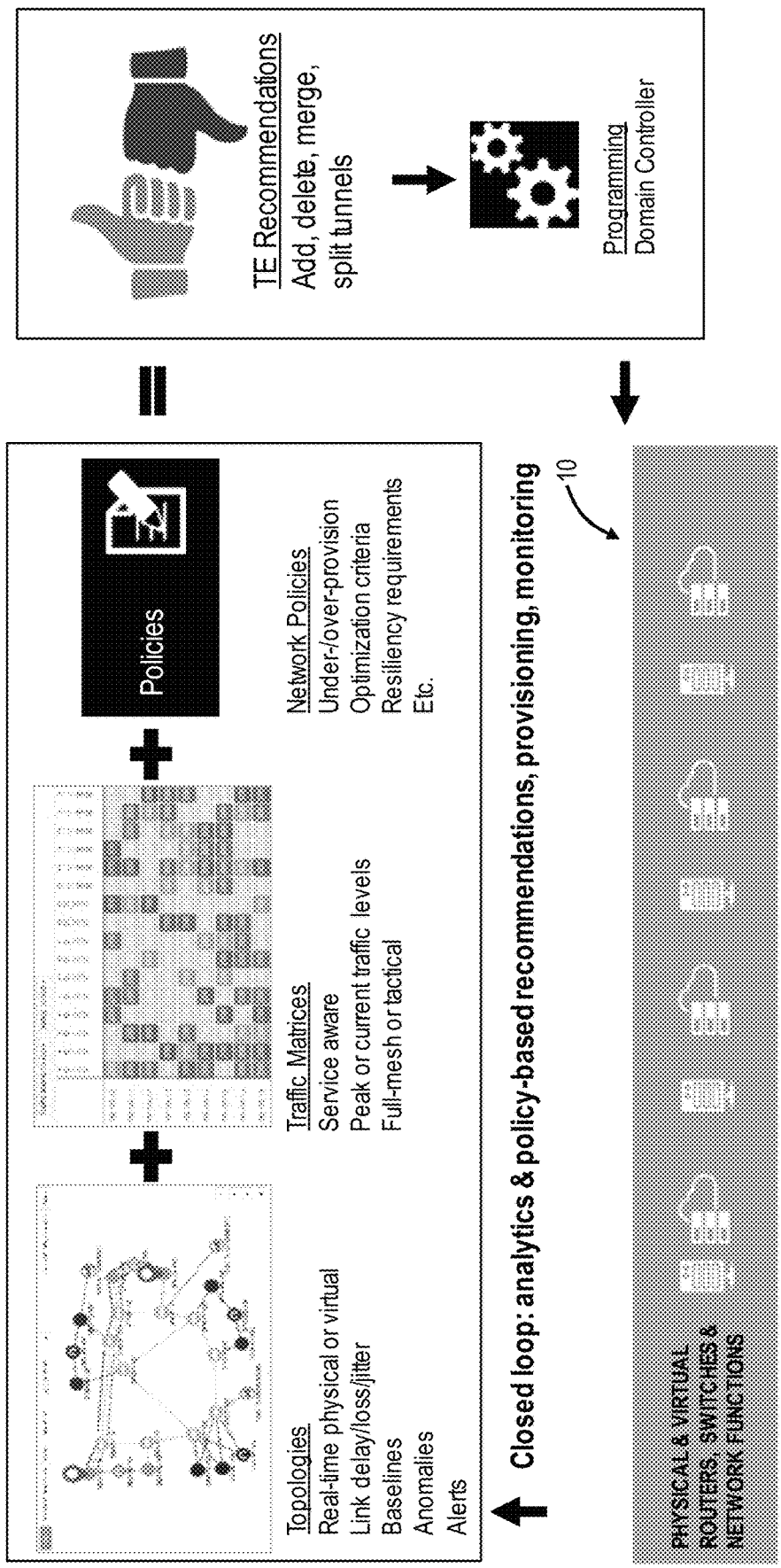
FIG. 5 is a diagram of workflow for the SDN IP application architecture.

FIG. 5 is a diagram of workflow for the SDN IP application 80 architecture. The SDN IP application 80 provides a closed loop for analytics and policy-based recommendations, provisioning, monitoring. The SDN platform enables closed loop analytics and automation to create more agile networks. Instead of requiring offline planning that can take hours or days, the SDN IP application 80 computes in seconds the optimum traffic engineering configurations to achieve desired goals. The SDN IP application 80 receives topologies from the network 10, such as real-time physical and/or virtual components, link delay/loss/jitter, baselines, anomalies, alerts, etc. The SDN IP application 80 can receive and/or determine traffic matrices that are service aware, include peak or current traffic levels, are full mesh or tactical, etc. Finally, the SDN IP application 80 can include network policies, e.g., under/over provision, optimization criteria, resiliency requirements, etc. Finally, the SDN IP application 80 can analyze these components to provide traffic engineering (TE) recommendations, e.g., add, delete, merge, and/or split SR policy objects or RSVP-TE tunnels. The SDN IP application 80 can then program the network 10 accordingly.

Optical Failure Analysis Process

Figure 6:
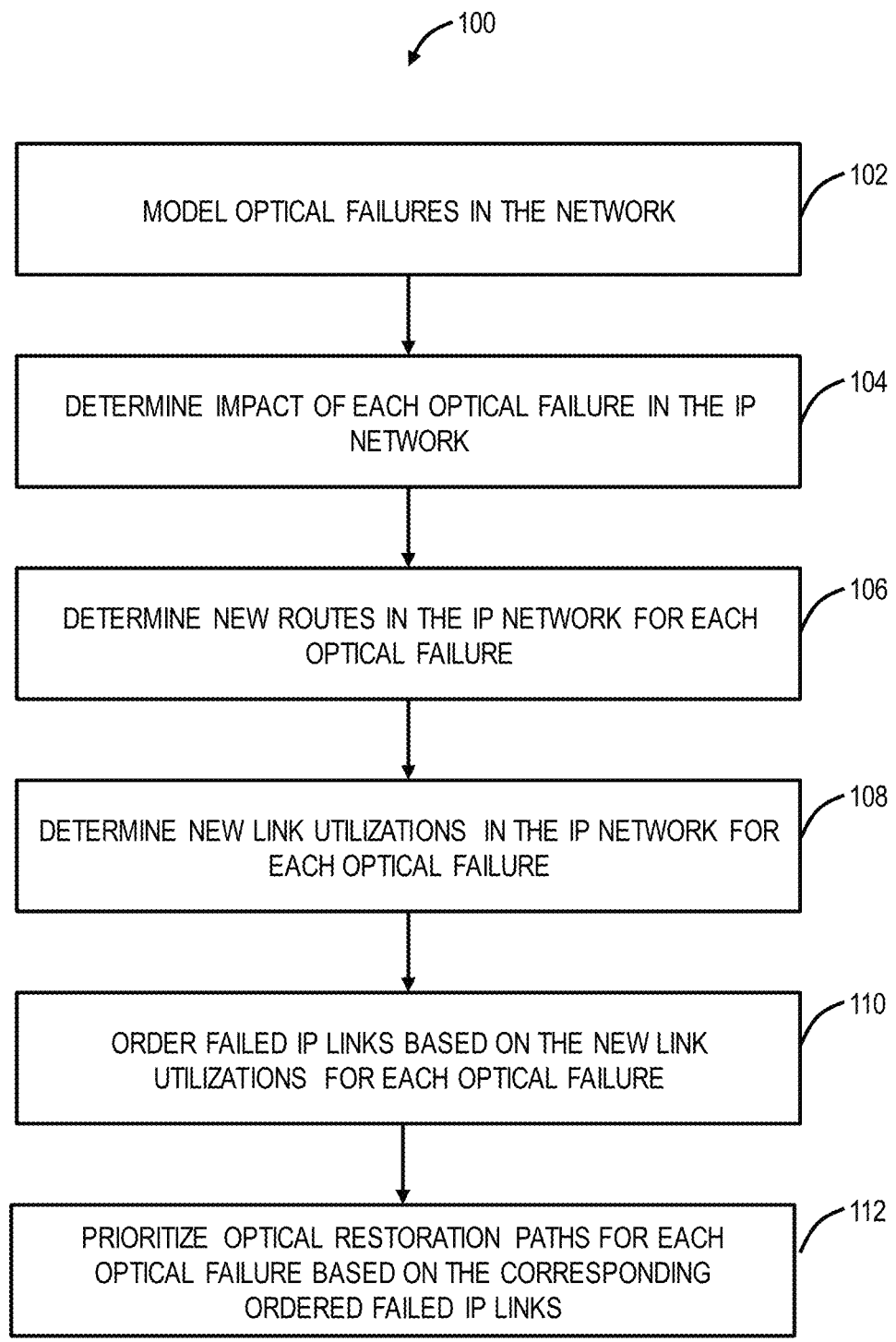
FIG. 6 is a flowchart of a process of optical failure analysis.

FIG. 6 is a flowchart of a process 100 of optical failure analysis. The process 100 contemplates implementation as a method having steps, via a processing device configured to implement the steps, via the controller 18, 50 configured to implement the steps, and as a non-transitory computer-readable medium with instructions stored thereon where the instructions cause at least one processor to execute the steps. For example, the process 100 can be implemented by the SDN controller 18, the SDN IP application 80, and/or another SDN application, as well as a combination thereof, in a distributed fashion. The optical failure analysis is configured to perform an analysis of multi-layer failures.

The process 100 includes modeling optical failures in the network 10 (step 102). The analysis can model the failure of every single and pair of DWDM Shared Risk Link Group (SRLG) values (this covers failure of DWDM links, Optical Multiplex Sections (OMS) sections, etc.). The process 100 then includes determining the impact of each optical failure in the IP network (step 104). The impact includes determining the IP network link failure(s) in response to the modeled optical failures. Note that, an optical failure may take multiple IP links down. For example, a fiber cut on a 400 Gb/s optical channel can take down many IP links.

The process 100 then includes determining new IP routes that would be taken around these failures, i.e., new IP routes for each optical failure (step 106). The determination of new routes requires modeling IGP and BGP routing decisions, RSVP-TE and Segment Routing (SR)-Policy protections (whether secondary tunnels or Fast Re-route (FRR) protections are used), and as well as full RSVP-TE and SR-Policy path re-optimization at the head-end of these tunnels or at a centralized PCE.

Using a current (as well as predicted) traffic demand matrix, available from the SDN IP application 80, the process 100 includes determining the expected new link utilizations in the IP network for each optical failure (step 108). The new link utilizations can be used to detect congestion and packet drops. This report of the expected new link utilizations can then be used to order failed IP links from worst impacting to least impacting priority order, for each optical failure (step 110).

The process 100 further includes prioritizing optical restoration paths for each optical failure based on the corresponding ordered failed IP links (step 112). The ordered list of IP links can be converted into SNCs and passed to a planning tool or application which computes the prioritized DTL sets for the SNCs.

Prioritized Optical Restoration Path Process

Figure 7:
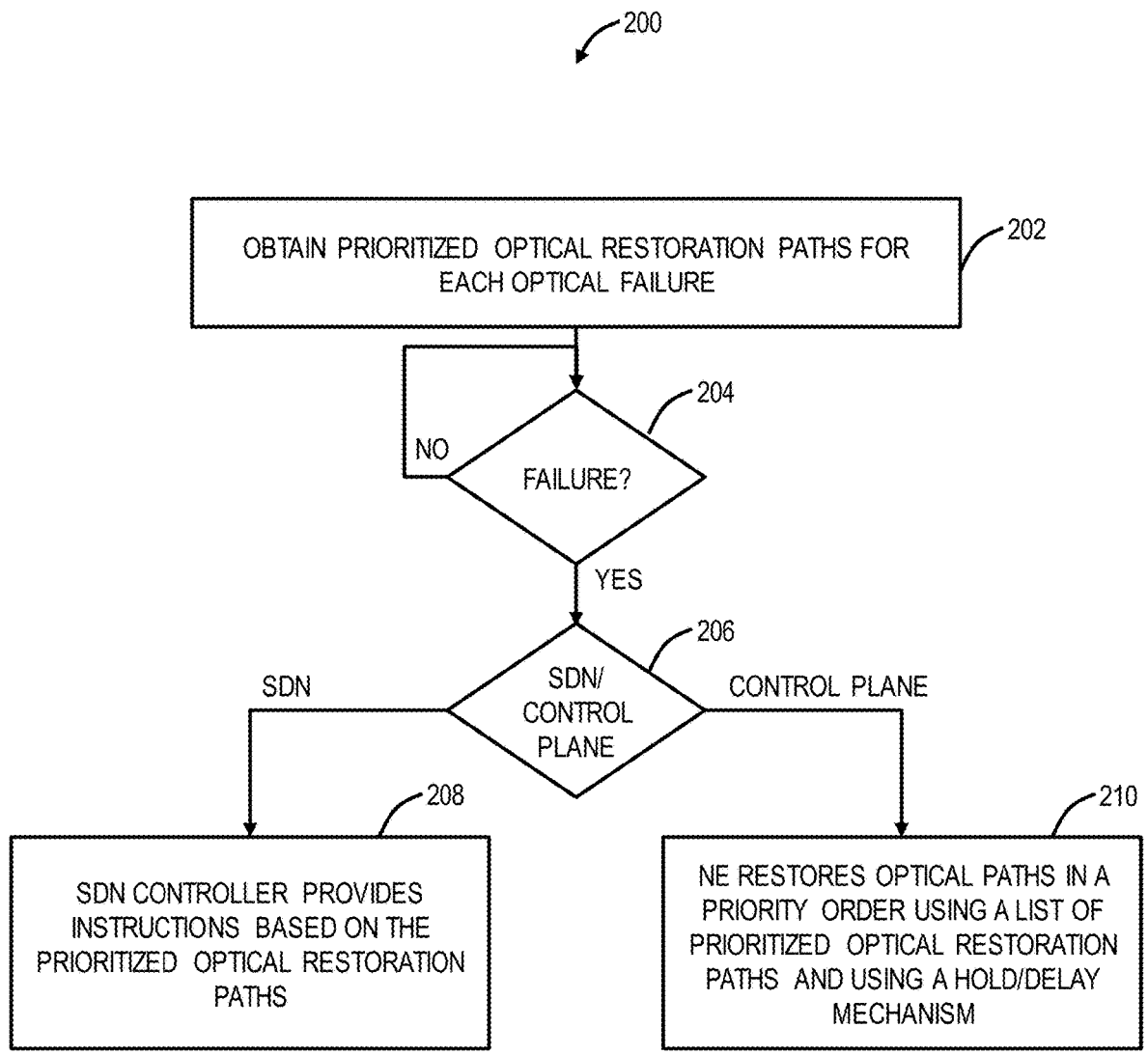
FIG. 7 is a flowchart of a process of use of prioritized optical restoration paths when there is a failure.

FIG. 7 is a flowchart of a process 200 of use of prioritized optical restoration paths when there is a failure. The process 200 contemplates implementation as a method having steps, via a processing device configured to implement the steps, via the controller 50 configured to implement the steps, and as a non-transitory computer-readable medium with instructions stored thereon where the instructions cause at least one processor to execute the steps. For example, the process 200 can be implemented by the SDN controller 18, by a network element 30, as well as a combination thereof, in a distributed fashion.

The process 200 contemplates implementation with or after implementation of the process 100. The process 200 includes obtaining prioritized optical restoration paths for each optical failure (step 202). Here, the output of the process 100 is a list of optical restoration paths in order for each optical failure. Again, the list can be a DTL list, ERO list, etc. and this can be obtained by the SDN controller 18 and/or at each network element 30. The list is stored and only used when there is a given optical failure (step 204). Of note, there can be multiple lists, one for each different optical failure.

When there is a specific optical failure (step 204), the use of the stored lists depends on whether this approach is SDN or control plane (step 206). The SDN controller 18 is a centralized approach where the lists can be handled for each originating network element in a unified manner. The control plane 16 is a distributed approach where each network element 30 can operate independently, leading to potential contention.

For SDN (step 206), the SDN controller 18 provides instructions based on the prioritized optical restoration paths (step 208). Upon a failure, a source network element 30 of the SNC waits for the SDN controller 18 for instructions. The SDN controller 18 detects the failure (usually notified by NEs) and determines which SNCs to restore using the priority order according to the process 100 and the exact DTL according to a planning tool. If multiple failures happen in succession, the SDN controller 18 may undo some of the earlier restorations to give higher priority SNCs a chance. In addition, the SDN controller 18 may run the analysis again to reprioritize the remaining resources.

For the control plane (step 206), the network element 30 restores optical paths in a priority order using a list of prioritized optical restoration paths and using a hold/delay mechanism (step 210). The network element 30 receives the DTL sets (list of optical restoration paths in order for each optical failure) for their SNCs prior to any failures. When a failure is detected, the network element 30 restores its SNCs in the priority order using the DTL sets received. However, two network elements 30 acting in a distributed fashion may restore two SNCs in reverse order of global priority and cause a higher priority SNC to fail restoration. To avoid this, we propose to use two mechanisms, namely a hold priority approach and a delay mechanism.

In the first mechanism, the hold priority approach, we use two different hold priorities for restoration and home paths (we do not want to preempt a home path, we only want to preempt a restoration path). Two different home and restoration path hold priorities can be part of the control plane. Once, preemption functionality is available, the hold priority of restoration SNCs are set to mimic the global priority list from the IP impact analysis. As a result, the SNC with lower hold priority will be preempted by a higher priority SNC. The preempted SNC may be tried again on other paths in its DTL set and may in return preempt other SNCs. This approach may cause too much churn in the network to be acceptable by service providers. It might be better to converge slowly, but with much less churn.

We address this in the second mechanism, the delay mechanism, by introducing a delay before restoring any SNCs. The delay can be inversely proportional to the restoration priority of the SNC. That is, there is no wait for the highest priority SNCs (priority level 0). The next priority level SNCs can wait for all of the higher priority SNCs to complete signaling. The time for this can be estimated or configured. Thus, a network element 30 whose next SNC to be restored is at priority level N, needs to wait N times the delay configured (from the time the link failure is detected). That is, if it takes x units of time to restore SNCs of a priority level, SNC at priority level 0 are restored immediately, at priority 1 are restored after x time has passed, at priority 2 are restored after 2x time, etc. The delay may be estimated by either a management system, the SDN controller 18, etc. For example, there can be historical tracking of restoration times for a given priority and these can be used for a current estimate. If configured, it may need to be pessimistic.

There is a variation of the first mechanism, the hold priority approach, that uses a different type of DTLs called associated hop DTLs. Associated hop DTLs are described in U.S. Pat. No. 8,619,553, issued Dec. 31, 2013, and entitled "Methods and systems for mesh restoration based on associated hop designated transit lists," the contents of which are incorporated by reference in their entirety. These are not used in the normal priority order but are instead selected by the failed link returned by a control plane release message. This allows a unique route to be calculated by the SDN controller 18 for each possible failure and avoids contention for each case. For L0, this can also allocate the wavelength to use. A big advantage here is that the higher priority services can have their routes calculated in priority order to allocate network resources to those services first. The present disclosure also combines this type of DTLs with the priority list from the SDN IP application 80 to achieve the maximum benefit from available resources in a multi-layer network 10. For example, it will not supply a DTL for a given failure if it is understood that the protection (including congestion avoidance) is covered by L3-essentially when this link fails do not do anything.

Benefit

Network operators often protect traffic both at the IP and optical layers. This is redundant and causes unnecessary capital expenditure spending. The present disclosure prioritizes IP links failures due to optical failures. The links that have very small impact do not need to be restored at all at the optical network. That is, it is possible to let IP network restore its traffic to the extent possible, and only restore the SNCs where IP network could not find a congestion-free solution. This would reduce the duplicate redundancy.

Beyond Optical and IP Layers

The present disclosure has been described with reference to the optical and IP layers. However, the approach described herein can be generalized to any pair of layers, e.g., client layer and server layer. As described herein, a client layer is the higher layer that operates over a server layer which is a lower layer. For example, IP is a client of the optical layer.

In a generalized approach, we need a function that ranks the damage on higher layer link failures caused by lower layer link failures. This function may look at congestion, packet drops, delay, or other metrics individually, or may combine them (e.g., "congestion damage*a+delay damage*b" looks at both delay and congestion simultaneously, where a and b are weight coefficients of these parameters). Once the failures are prioritized at the higher layer (this may be the client layer), the protection paths are computed as described above and deployed to the lower layer network devices.

Figure 8:
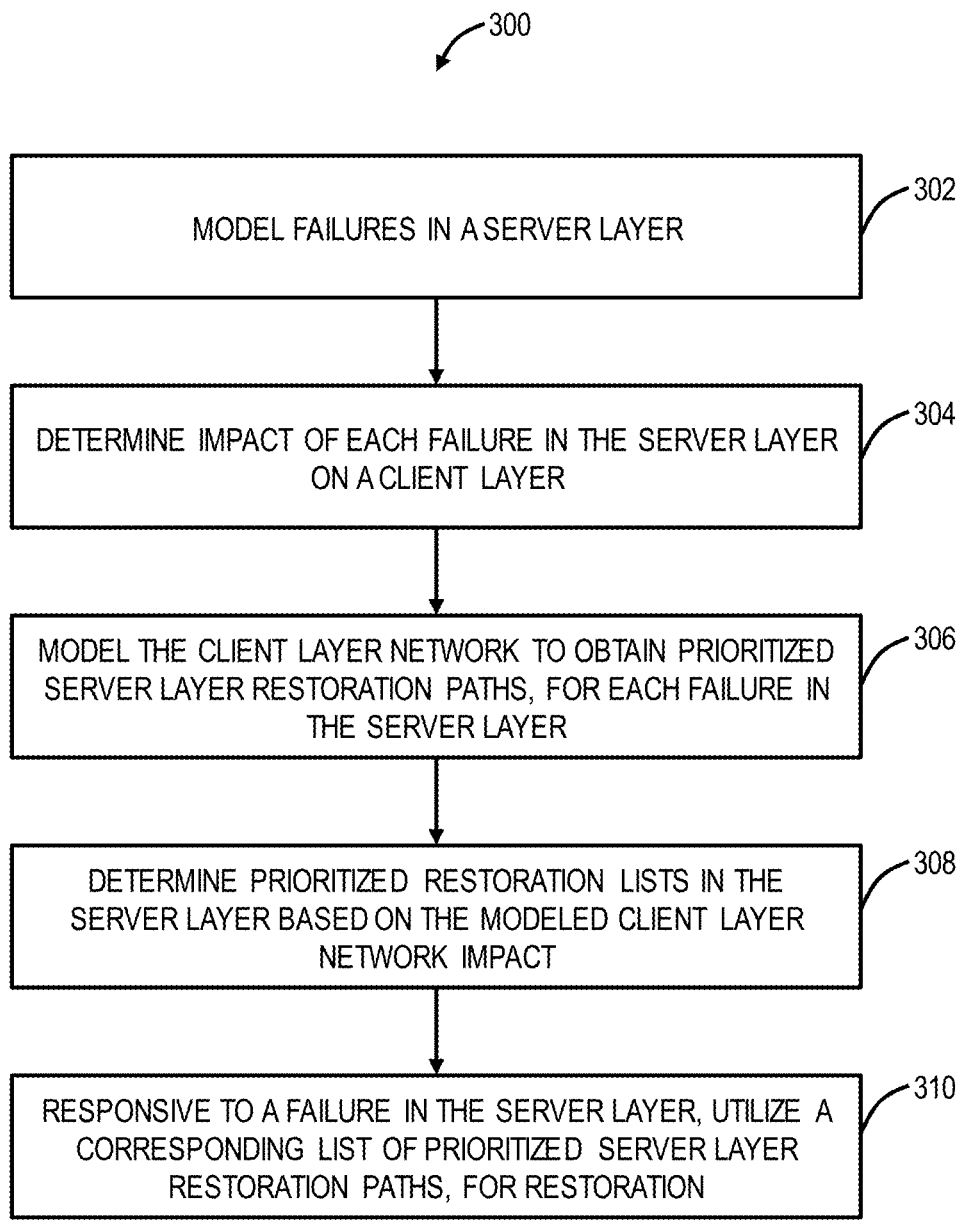
FIG. 8 is a flowchart of a generalized process of optimizing restoration paths at a server layer based on impact at a client layer.

FIG. 8 is a flowchart of a generalized process 300 of optimizing restoration paths at a server layer based on impact at a client layer. The process 300 contemplates implementation as a method having steps, via a processing device configured to implement the steps, via the controller 18, 50 configured to implement the steps, and as a non-transitory computer-readable medium with instructions stored thereon where the instructions cause at least one processor to execute the steps. The process 300 generalizes the description presented herein with respect to the optical layer and the IP layer to between any server and client layer.

The process 300 includes modeling failures in a server layer (step 302), and determining impact of each failure in the server layer on a client layer (step 304). The client layer is a higher layer relative to the server layer, i.e., the client layer operates over the server layer. In such a manner, the client layer and the server layer can be referred to a pair of layers. Examples pair of layers include IP over Optical (L3 over L0), TDM over DWDM (L1 over L0), Ethernet over OTN (L2 over L1), IP over OTN (L3 over L1), Ethernet over DWDM (L2 over L0), etc.

The process 300 further includes modeling the client layer network to obtain prioritize server layer restoration paths, for each failure in the server layer (step 306). Next, the process 300 includes determining prioritized restoration lists in the server layer, for a given failure, based on the modeled client layer network impact (step 308). Steps 302-308 are modeling/analysis steps that are performed offline, prior to any failure. As described herein, the objective of the modeling/analysis steps is to determine a list of prioritized restoration lists in the server layer that can be used at the time of a failure to restore the server layer in such a manner that advantageous for the client layer.

The process 300 includes, responsive to a failure in the server layer, utilizing a corresponding list of prioritized server layer restoration paths, for restoration (step 310). The offline modeling/analysis steps cannot be implemented at runtime, i.e., in real-time at the time of the failure. In such a manner, the process 300 enables a network element to have lists of prioritized server layer restoration paths that can achieve some benefit in the client layer.

Process

Figure 9:
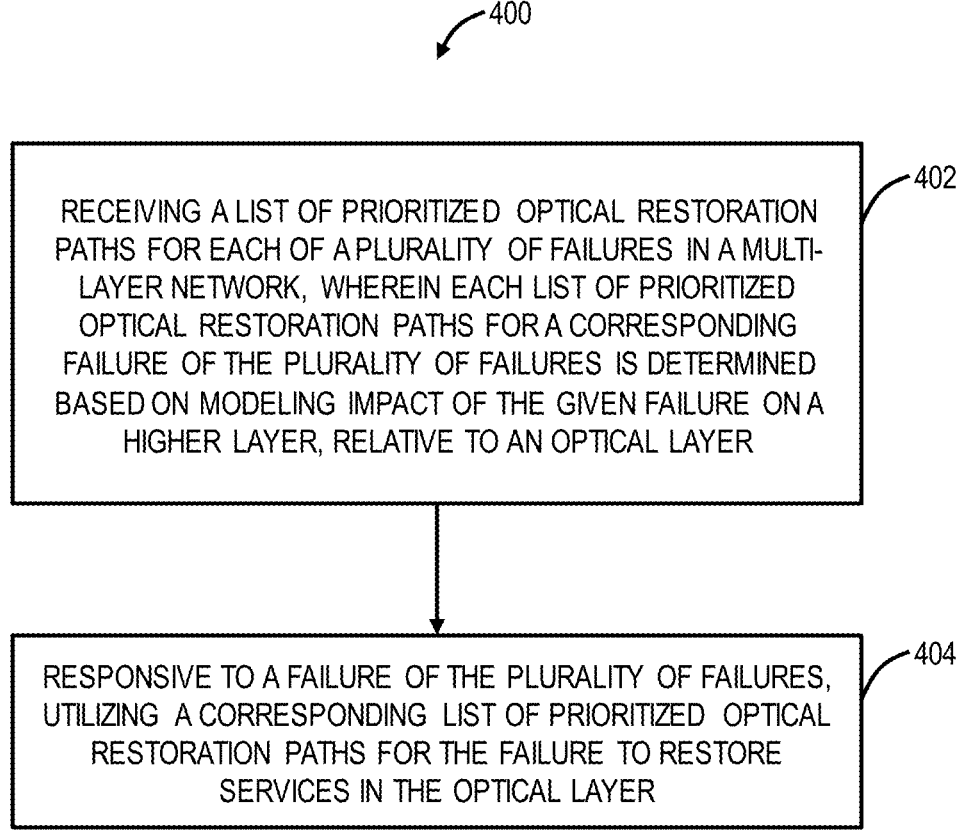
FIG. 9 is flowchart of a process for prioritizing optical routes for restoration based on failure impact on the IP layer.

FIG. 9 is flowchart of a process 400 for prioritizing optical routes for restoration based on failure impact on the IP layer. The process 400 contemplates implementation as a method having steps, via a processing device configured to implement the steps, via the controller 18, 50 configured to implement the steps, and as a non-transitory computer-readable medium with instructions stored thereon where the instructions cause at least one processor to execute the steps. Of note, the process 400 contemplates implementation by the SDN controller 18, by a network element 30 participating in the control plane 16, via the controller 50, and the like.

The process 400 includes receiving a list of prioritized optical restoration paths for each of a plurality of failures in a multi-layer network, wherein each list of prioritized optical restoration paths for a corresponding failure of the plurality of failures is determined based on modeling impact of the given failure on a higher layer, relative to an optical layer (step 402); and, responsive to a failure of the plurality of failures, utilizing a corresponding list of prioritized optical restoration paths for the failure to restore services in the optical layer (step 404).

The modeling impact can include determining new routes and link utilization in the higher layer, prioritizing links in the higher layer, and utilizing the prioritized links to determine the list of prioritized optical restoration paths, for the given failure. The higher layer can be an Internet Protocol (IP) layer. The modeling can be performed in Software Defined Networking (SDN) application that monitor the IP layer, determines and estimates a traffic matrix, and that analyzes the impact of the given failure on the IP layer. The higher can be an Ethernet layer.

The process 400 can further include utilizing the corresponding list of prioritized optical restoration paths for the failure to restore services in the optical layer, via a Software Defined Networking (SDN) controller that has a centralized view of the multi-layer network. The process 400 can further include utilizing the corresponding list of prioritized optical restoration paths for the failure to restore services in the optical layer, via a network element participating in a distributed control plane. In an embodiment, the network element can utilize different hold priorities for restoration and home paths, for preemption of higher priority services in the multi-layer network. In another embodiment, the network element can utilize delay timers for each of a plurality of priorities of services in the list of prioritized optical restoration paths.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause at least one processor to perform steps of:
  receiving a list of prioritized optical restoration paths for each of a plurality of failures in a multi-layer network, wherein each list of prioritized optical restoration paths for a corresponding failure of the plurality of failures is determined based on modeling impact of a given failure on a higher layer, relative to an optical layer, wherein the higher layer is separate from the optical layer, and wherein prioritization in the list of prioritized optical restoration paths includes ranking based on impact of the corresponding failure of the plurality of failures in the higher layer; and responsive to a failure of the plurality of failures, utilizing a corresponding list of prioritized optical restoration paths for the failure to restore services in the optical layer.

2. The non-transitory computer-readable medium of claim 1, wherein the modeling impact includes determining new routes and link utilization in the higher layer, prioritizing links in the higher layer, and utilizing the prioritized links to determine the list of prioritized optical restoration paths, for the given failure.

3. The non-transitory computer-readable medium of claim 1, wherein the higher layer is an Internet Protocol (IP) layer.

4. The non-transitory computer-readable medium of claim 3, wherein the modeling is performed in Software Defined Networking (SDN) application that monitor the IP layer, determines and estimates a traffic matrix, and that analyzes the impact of the given failure on the IP layer.

5. The non-transitory computer-readable medium of claim 1, wherein the higher layer is an Ethernet layer.

6. The non-transitory computer-readable medium of claim 1, wherein the steps further include utilizing the corresponding list of prioritized optical restoration paths for the failure to restore services in the optical layer, via a Software Defined Networking (SDN) controller that has a centralized view of the multi-layer network.

7. The non-transitory computer-readable medium of claim 1, wherein the steps further include utilizing the corresponding list of prioritized optical restoration paths for the failure to restore services in the optical layer, via a network element participating in a distributed control plane.

8. The non-transitory computer-readable medium of claim 7, wherein the network element utilizes different hold priorities for restoration and home paths, for preemption of higher priority services in the multi-layer network.

9. The non-transitory computer-readable medium of claim 7, wherein the network element utilizes delay timers for each of a plurality of priorities of services in the list of prioritized optical restoration paths.

10. A method comprising steps of:

receiving a list of prioritized optical restoration paths for each of a plurality of failures in a multi-layer network, wherein each list of prioritized optical restoration paths for a corresponding failure of the plurality of failures is determined based on modeling impact of a given failure on a higher layer, relative to an optical layer, wherein the higher layer is separate from the optical layer, and wherein prioritization in the list of prioritized optical restoration paths includes ranking based on impact of the corresponding failure of the plurality of failures in the higher layer; and responsive to a failure of the plurality of failures, utilizing a corresponding list of prioritized optical restoration paths for the failure to restore services in the optical layer.

11. The method of claim 10, wherein the higher layer is one of L1, L2, or L3 and wherein the modeling impact includes determining new routes configured to avoid failures and link utilization in the higher layer, prioritizing links in the higher layer, and utilizing the prioritized links to determine the list of prioritized optical restoration paths, for the given failure.

12. The method of claim 10, wherein the higher layer is an Internet Protocol (IP) layer.

13. The method of claim 12, wherein the modeling is performed in Software Defined Networking (SDN) application that monitor the IP layer, determines and estimates a traffic matrix, and that analyzes the impact of the given failure on the IP layer.

14. The method of claim 10, wherein the higher layer is an Ethernet layer.

15. The method of claim 10, wherein the steps further include utilizing the corresponding list of prioritized optical restoration paths for the failure to restore services in the optical layer, via a Software Defined Networking (SDN) controller that has a centralized view of the multi-layer network.

16. The method of claim 10, wherein the steps further include utilizing the corresponding list of prioritized optical restoration paths for the failure to restore services in the optical layer, via a network element participating in a distributed control plane.

17. The method of claim 16, wherein the network element utilizes different hold priorities for restoration and home paths, for preemption of higher priority services in the multi-layer network.

18. The method of claim 16, wherein the network element utilizes delay timers for each of a plurality of priorities of services in the list of prioritized optical restoration paths.

19. A controller comprising:

at least one processor; and memory storing instructions that, when executed, cause the at least one processor to receive a list of prioritized optical restoration paths for each of a plurality of failures in a multi-layer network, wherein each list of prioritized optical restoration paths for a corresponding failure of the plurality of failures is determined based on modeling impact of a given failure on a higher layer, relative to an optical layer, wherein the higher layer is separate from the optical layer, and wherein prioritization in the list of prioritized optical restoration paths includes ranking based on impact of the corresponding failure of the plurality of failures in the higher layer, and responsive to a failure of the plurality of failures, utilize a corresponding list of prioritized optical restoration paths for the failure to restore services in the optical layer.

20. The controller of claim 19, wherein the modeling impact includes determining new routes and link utilization in the higher layer, prioritizing links in the higher layer, and utilizing the prioritized links to determine the list of prioritized optical restoration paths, for the given failure.

* * * * *